United States Patent
Sugata et al.

(10) Patent No.: US 7,223,221 B2
(45) Date of Patent: May 29, 2007

(54) COLUMN MOVING TYPE MACHINE TOOL WITH SHIELD MACHINING SPACE

(75) Inventors: Shinsuke Sugata, Fukuyama (JP); Yoshinori Seo, Fukuyama (JP)

(73) Assignee: Horkos Corp., Fukuyama (JP)

( * ) Notice: Subject to any disclaimer, the term of this patent is extended or adjusted under 35 U.S.C. 154(b) by 123 days.

(21) Appl. No.: 10/545,418

(22) PCT Filed: Feb. 26, 2003

(86) PCT No.: PCT/JP03/02162

§ 371 (c)(1),
(2), (4) Date: Aug. 12, 2005

(87) PCT Pub. No.: WO2004/076122

PCT Pub. Date: Sep. 10, 2004

(65) Prior Publication Data

US 2006/0194682 A1     Aug. 31, 2006

(51) Int. Cl.
*B23Q 3/157* (2006.01)
*B23C 9/00* (2006.01)

(52) U.S. Cl. .............................. 483/3; 483/16; 483/30; 409/134; 409/141

(58) Field of Classification Search .................... 483/3, 483/30, 16; 409/134, 235, 190, 191, 201, 409/202, 141, 212, 236, 237; 408/234, 241 G, 408/143, 235; 74/608, 612, 613; 451/451, 451/455, 340; 29/39, DIG. 56, DIG. 59, 29/DIG. 60, DIG. 86, DIG. 94, DIG. 102
See application file for complete search history.

(56) References Cited

U.S. PATENT DOCUMENTS

| 5,988,959 | A  | * | 11/1999 | Sugata ........................ 409/141 |
| 6,519,823 | B1 | * | 2/2003  | Sugata et al. ................. 483/16 |
| 6,547,498 | B1 | * | 4/2003  | Sugata et al. ............... 409/134 |
| 6,551,038 | B1 | * | 4/2003  | Sugata et al. ............... 409/134 |
| 6,811,361 | B2 | * | 11/2004 | Sugata et al. ............... 409/134 |

FOREIGN PATENT DOCUMENTS

| JP | 10-138085  | 5/1998  |
| JP | 2002-205241| 7/2002  |
| WO | 01/82389   | 11/2001 |

* cited by examiner

*Primary Examiner*—Dana Ross
(74) *Attorney, Agent, or Firm*—Merek, Blackmon & Voorhees, LLC

(57) ABSTRACT

A machine tool capable of reducing the lateral width of the upper part thereof by reducing the lateral width of a bed (1) while machining through the same lateral moving distance of a spindle (10) as before, comprising longitudinal guide rails (2) installed on the bed (1), a slide (3) installed through the guide rails (2) movably in a longitudinal direction, a column (6) movable in vertical direction, wherein first cover plates (25) are fixed at the right and left sides of a vertical moving route for the spindle (10), side cover plates (26) are installed continuously with the outer end edges of the first cover plates (25) so as to be turnable rearward, a second cover plate (32) is installed at the front sides of the first cover plates (25) and the side cover plates (26) integrally with the slide (3) so as to cover the front side of the moving range of the column (6), and a shielded machining space (SK) is formed at the front of the second cover plate (32).

8 Claims, 13 Drawing Sheets

Prior Art

COLUMN MOVING TYPE MACHINE TOOL WITH SHIELD MACHINING SPACE

FIELD OF THE INVENTION

The present invention relates to a column moving type machine tool with a shielded machining space.

BACKGROUND OF THE INVENTION

There is a machining center forming a kind of column moving type machine tool as shown in FIG. 13.

In the figure, 1 is a bed, a top face 1a thereof is enlarged, and a column support face 1b is formed to a part of the top face 1a. Longitudinal guide rails 2, 2 are fixed on the column support face 1b.

A slide 3 is slidably and displaceably engaged with the guide rails 2, 2 to move in a longitudinal direction f1 by a motor 4.

Lateral guide rails 5, 5 are fixed on the slide 3, and a column 6 is slidably and displaceably engaged with the lateral guide rails 5, 5 to move in a lateral direction f2 by a motor 7.

A spindle device 8 is longitudinally installed to the column 6 to vertically move on a fixed orbit through a motor 9.

In this case, the spindle device 8 comprises a longitudinal spindle 10 whose front end serves as an end for installing a cutting tool, a bearing cylinder 11 supporting the spindle 10, and a motor 12 for rotating the spindle 10.

A lateral standing cover wall 13 is provided close to the front face of the column 6 so as to prevent cutting chips and coolant from splashing. The cover wall 13 comprises lateral extensible cover walls 14, 14 fixed to right and left sides of the spindle 10, and a vertical extensible cover wall 15 provided on a vertical moving route for the spindle 10.

In this case, a lateral extensible cover wall 14 comprises a plurality of plates 14a superposed slidably and displaceably in a lateral direction, each plate 14a being formed by bending upper and lower ends of a metal plate in wedge shape. The cover wall 15 is formed by superposing a plurality of metal plates 15a slidably and displaceably in a vertical direction.

A box casing 16 is provided on the top face 1a of the bed 1 so as to cover the column 6. A space in front of the standing cover wall 13 inside the casing 16 forms a shielded machining space SK. A jig support table 17 for fixing jigs is installed in the anterior part of the shielded machining space SK.

A longitudinal extensible cover device 18 is installed at the front face of the slide 3 to cover the guide rail 2, comprising a plurality of angle metal plates 18a superposed slidably and displaceably in the longitudinal direction f1, keeping the guide rails 2, 2 covered regardless of longitudinal movement of the column 6.

Besides, an automatic tool changer (ATC) is provided at a suitable position, such as an upper portion of the box casing 16.

When machining a work with this machining center, for example, the work is fixed at a specific position on the jig support table 17, needed information is inputted to a not-illustrated control device, and thereafter, an operation is started. According to this, the required motors 4, 7, 9 operate to move the spindle 10 in the longitudinal direction and in the lateral direction or in a vertical direction. In this state, a tool installed at the tip of the spindle 10 rotates together with the spindle 10 by the motor 12 to automatically cut the work.

During this machining, cutting chips of the work are scattered to the circumference by rotations of the tool and the spindle. In case of coolant machining, in which coolant is fed during machining, the coolant is splashed, thereby scattering cutting chips.

Although the scattered cutting chips drop on the extensible cover 18 and the like, they never accumulate on the guide rails 2, 5 directly. In addition, the cutting chips going to the column 6 never go into from the front face of the column 6 to the rear side because they are intercepted by the lateral standing cover wall 13. Accordingly, the column 6 works smoothly in the longitudinal direction and in the lateral direction, and the spindle 10 works in the vertical direction without interruption.

In the above-mentioned conventional machining center, since the lateral extensible cover walls 14, 14 are respectively formed by a plurality of plates 14a superposed slidably and displaceably in the lateral direction, they need a comparatively large lateral space even if they are made, at the most, short. Therefore, the lateral length of the machine tool is comparatively longer than the lateral displacement of the column 6, which is contrary to the intent of a compact device. In connection with this, since the lateral width of the shielded machining space SK is enlarged, much time is required to remove the cutting chips. In addition, since the longitudinal extensible cover device 18 is formed by a plurality of angle metal plates 18a superposed slidably and displaceably in the longitudinal direction f1, the cutting chips enter a sliding portion of each angle metal plate 18a over time. Therefore, the sliding portion is prevented from moving smoothly and slidably.

The present invention aims to provide a column moving type machine tool with a shielded machining space for solving the above-mentioned problems.

SUMMARY OF THE INVENTION

The present invention proposes a column moving type machine tool comprising a pair of right and left longitudinal guide rails installed on the top face of a bed, a slide installed through the guide rail movably in a longitudinal direction, a column installed on the slide movably in a lateral direction, and a longitudinal spindle installed at the front face of the column movably in a vertical direction, wherein first cover plates are fixed at the right and left sides of a vertical moving route for the spindle at the front side of the column, side cover plates are installed continuously with the outer end edges of the first cover plates so as to be bendable for rearward due to a guide means between the side cover plates and the slide, a second cover plate is installed in front of the first cover plates and the side cover plates integrally with the slide so as to cover the front side of the moving range of the column under the state in which vertical and lateral moving of the spindle is allowed, and a shield machining space is formed in front of the second cover plate.

According to this, when the column moves in the lateral direction, the side cover plates work so as to be turnable longitudinally from the first cover plates due to the guide means. Therefore, the first cover plates and the side cover plates are sized in the lateral width of the slide so as to intercept cutting chips at the front of the column. Accordingly, the lateral width of the shielded machining space is to be close to that of the slide.

The first cover plates and the side cover plates are to surely prevent the cutting chips produced in the shielded machining space from splashing for rearward from the front face of the column in connection with the second cover plate.

The present invention is embodied as follows.

The second cover plate is formed so as to cover the front face of the slide, and the lower edge thereof is close to the top face of the bed.

According to this, the second cover plate is to effectively intercept the cutting chips splashed due to the rotation of a tool installed on the spindle in front of the slide. Accordingly, the cutting chips are more effectively prevented from splashing rearward from the front face of the slide.

An automatic tool changer is provided at the upper portion of the column, higher than a ceiling wall portion surrounding the top face of the shielded machining space. The ceiling wall portion comprises a fixed ceiling wall portion and a moving ceiling wall portion. The fixed ceiling wall portion is made integral with the bed, and the moving ceiling wall portion is arranged close to the fixed ceiling wall portion in a vertically superposed manner, as well as fixed integrally with the column. The moving ceiling wall portion has a switch opening at the position related to the tool changer. The fixed ceiling wall portion and the moving ceiling wall portion are relatively displaced so as to vary their overlap amount in connection with the longitudinal movement of the column. In addition, the opening is to be opened and closed when the tool installed on the spindle is exchanged.

According to this, since the top face of the shielded machining space is formed by a ceiling wall portion lower than the tool changer, the range dirtied by the splash of cutting chips becomes narrower than the case where the ceiling wall portion is higher than the tool changer. In addition, since machining through a spindle head is enforced in the state in which the opening is closed, the splashed cutting chips are prevented from arriving at the tool changer.

A work opening is provided in the front wall surrounding the front face of the shielded machining space, comprising a vertical opening having an upper edge higher than the moving ceiling wall portion and a lateral opening formed at the upper portion of the jig support table of the fixed ceiling wall portion. Here, the lateral opening is related to the vertical opening. In addition, a door body comprising a standing door face portion for covering the vertical opening and a rearward protruding door face portion for covering the lateral opening is installed in the work opening to open-and-close displaceably in the lateral direction.

According to this, when the door body is opened, the work opening opens a front side and an upper side of a jig fixed on the jig support table. Therefore, it is easy to carry the work fixed to the jig into and out the shielded machining space in the state in which the ceiling wall portion is low. The fixed ceiling wall portion is formed from plate members comprising, a high-grade horizontal ceiling face portion, a standing ceiling face portion and a low-grade horizontal ceiling face portion ahead sequentially. The lateral opening ranges from the standing ceiling face portion to the low-grade horizontal ceiling face portion, and the rearward protruding ceiling face portion of the door body forms a shape corresponding to the lateral opening.

According to this, the top face of the shielded machining space is lowered so as to reduce the capacity, saving time for internal cleaning.

Rail cover members for covering longitudinal guide rails longitudinally moving on the slide are integrally fixed to the front side of the slide in a forward protrusive manner. Besides, the rail cover members are constructed so as not to extensibly deform.

When the cutting chips produced in the shielded machining space drop, some them arrive at the top face of the rail cover members. However, since the rail cover members are not extensively deformed, they are not affected even if the cutting chips accumulate thereon.

Moreover, a jig support table and a covering member therefor are provided at the front side of the shielded machining space. The covering member for jig support table comprises a horizontal face portion covering the top face portion of the support table and a standing face portion covering the rear face portion thereof. The standing face portion has a notch, and the lower edge thereof is made close to the top face of the bed. The fronts of the rail cover members are inserted below the covering members for the jig support table through the notch movably in the longitudinal direction.

According to this, the covering members for the jig support table prevent the cutting chips from splashing to the top face of the jig support table and the lower side thereof. In addition, the rail cover members can longitudinally move regardless of the covering members for the jig support table.

Furthermore, a brush means is provided to the upper portion of the notch, scraping the cutting chips on the top face of the rail members. According to this, the cutting chips on the rail cover members come not to intrude into the inside of the lower portion of the covering members for the jig support table through an interval between the notch and the rail cover members.

PREFERRED EMBODIMENT OF THE PRESENT INVENTION

FIGS. 1 to 9 show a column moving type machining center as a machine tool related to the present invention, and in the following explanation, differences from the above-mentioned conventional example will be mainly explained.

Figure 1:
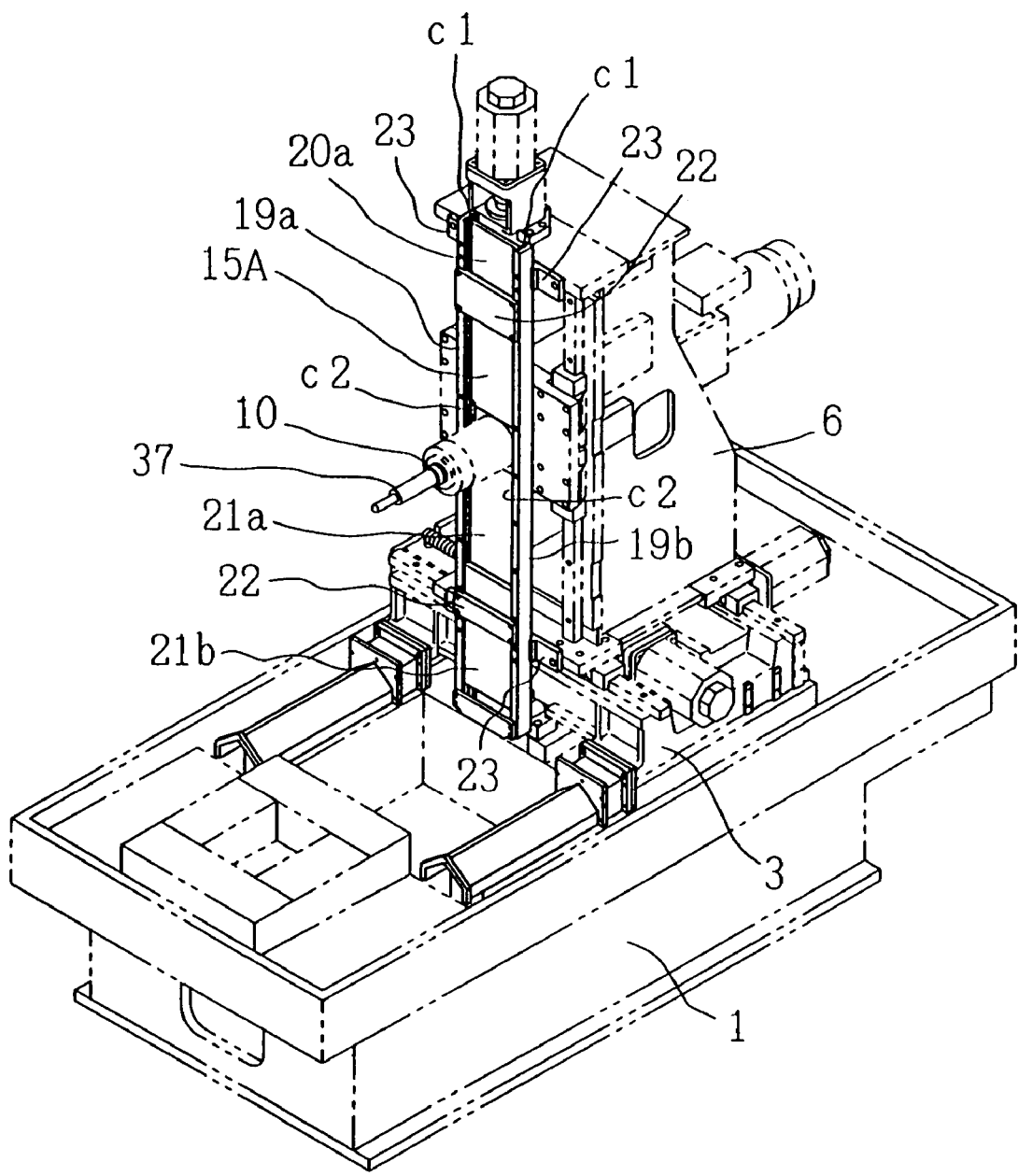
FIG. 1 is a perspective view showing the front of a vertical cover wall of a column moving type machining center related to the present invention.

In FIG. 1, a vertically extensible cover wall 15A, which is deformed from the conventional vertically extensible cover wall 15, is installed at the center of lateral width of a front face of a column 6.

A detail structure of the cover wall 15A will be explained in detail as follows. Therein, a pair of guide groove members 19a, 19b are standingly fixed to the front face of the column 6 that forms right and left sides of a bearing cylinder 11 rotatively supporting a spindle 10. An upper cover plate 20a is engaged between guide grooves c1, c1 of the guide groove members 19a, 19b that form the upside of the bearing cylinder 11 and the lower end edge is combined with the upper half of the bearing cylinder 11 displaceably in a vertical direction, and the lower end edge is combined with the upper half of the bearing cylinder 11. Two lower cover plates 21a, 21b are arranged between the guide groove members 19a, 19b that from the downside of the bearing cylinder 11. The lower cover plate 21a is engaged between guide grooves c1, c1 of the guide groove members 19a, 19b displaceably in the vertical direction, and the upper end edge is combined with the lower half of the bearing cylinder 11. And the lower cover plate 21b is engaged between guide grooves c2, c2 parallel formed at the front of the guide grooves c1, c1 of the guide groove members 19a, 19b.

When the bearing cylinder 11 ascends from the lowest position thereof, the lower cover plate 21a first ascends from the lowest position individually. And when the lower edge thereof arrives at the upper edge of the other lower cover plate 21b in the lowest position shown in FIG. 1, the lower edge is engaged to the upper edge so that the two lower cover plates 21a, 21b ascend integrally. Conversely, when the bearing cylinder 11 descends from the highest position, the lower cover plate 21a descends from the highest position with the lower cover plate 21b. In this case, when the lower cover plate 21b arrives at the lowest position to regulate the further descent, the lower edge of the lower cover plate 21a separates from the upper edge of the lower cover plate 21b, and thereafter, only the lower cover plate 21a descends. Besides, the upper cover plate 20a is vertically displaced interlockingly with vertical displacement of the bearing cylinder 11.

Here, 22 is a plate member for combining the right and left guide groove members 19a, 19b, and 23 is a combining piece for fixing each of the guide groove members 19a, 19b to the column 6.

Figure 2:
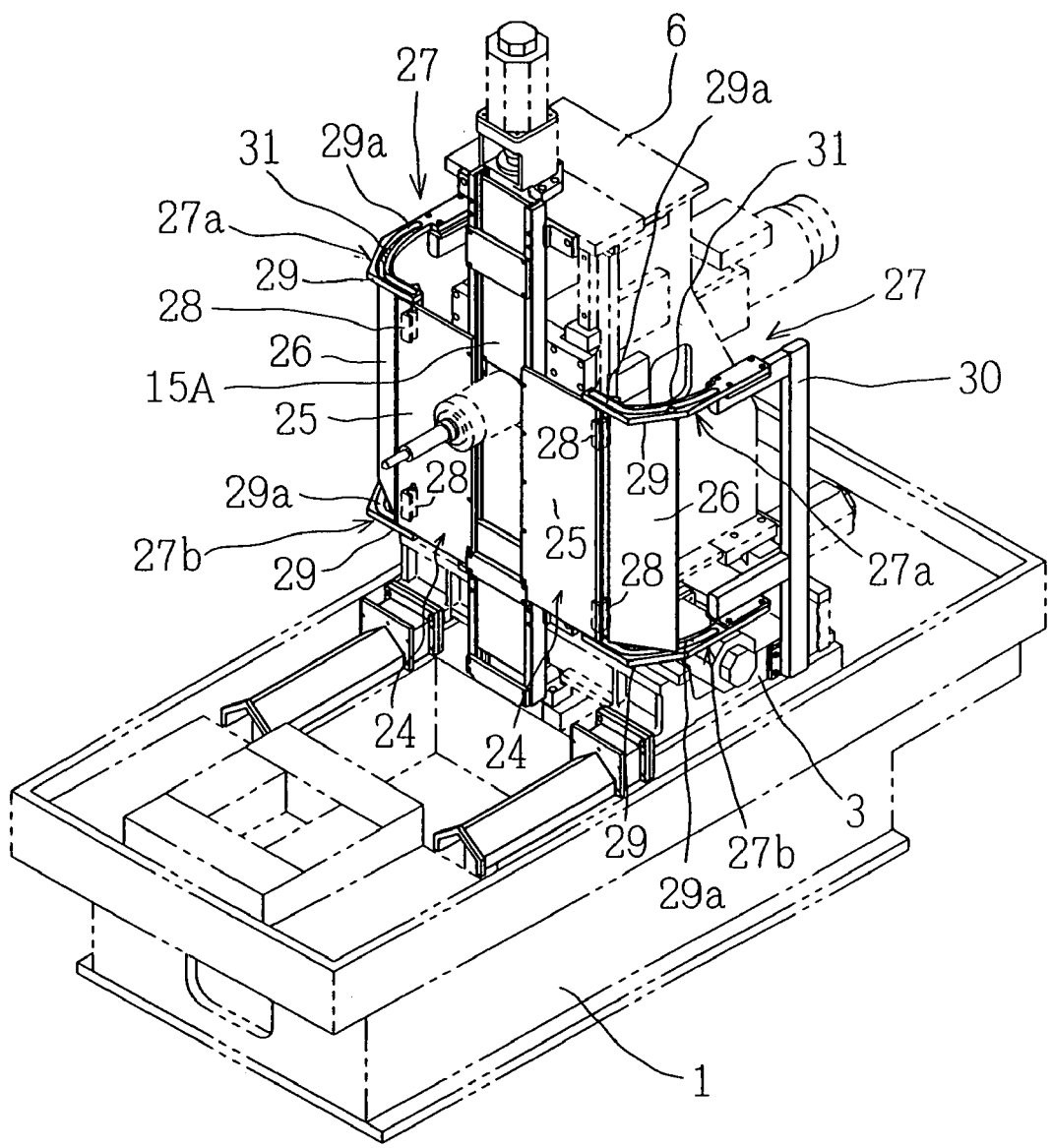
FIG. 2 is a perspective view showing a turnable cover device of the machining center.

In FIG. 2, cover devices 24, 24 in accordance with Japanese Patent No. 3168328 are provided at right and left sides of a vertical moving route of the spindle 10, namely right and left sides of the vertically extensible cover wall 15A.

A detail structure of the cover devices 24, 24 will be explained. First cover plates 25, 25 formed in rectangular shape, which cover the vertical length range of the vertical extensible covering wall 15A corresponding to the vertical moving range of the bearing cylinder 11 in the whole width thereof, are fixed to right and left sides of the covering wall 15A in front of the column 6. Side cover plates 26, 26 are installed continuously with the outer end edges of the first cover plates 25, 25 so as to be bendable for rearward through guide means 27, 27 formed between the side cover plates 26 and the slide 3.

In more detail, the side cover plates 26, 26 are installed to the outer end edges of the first cover plates 25, 25 through hinged joints 28 so as to longitudinally oscillate. Then, the guide means 27, 27 are formed so as to correspond to the side cover plates 26, 26. These guide means 27, 27 comprise guide mechanisms 27a, 27a formed at the upper and the lower ends of the side cover plates 26. And therein, a pair of upper and lower guide plates 29, 29 each shaped as a hook in plan view are fixed to a standing support member 30 fixed to the side faces of the slide 3, and rollers 31 protruded from the upper and lower edges of the side cover plates 26 are inserted into guide routes 29a shaped as a quarter-circle formed in the guide plates 29. In addition, a not-illustrated spring is extended between a portion near the center of curvature of the guide route 29a and a support shaft of the roller 31, and through this energizing power, the side cover plates 26 are pulled so as to be oscillated rearward.

Figure 3:
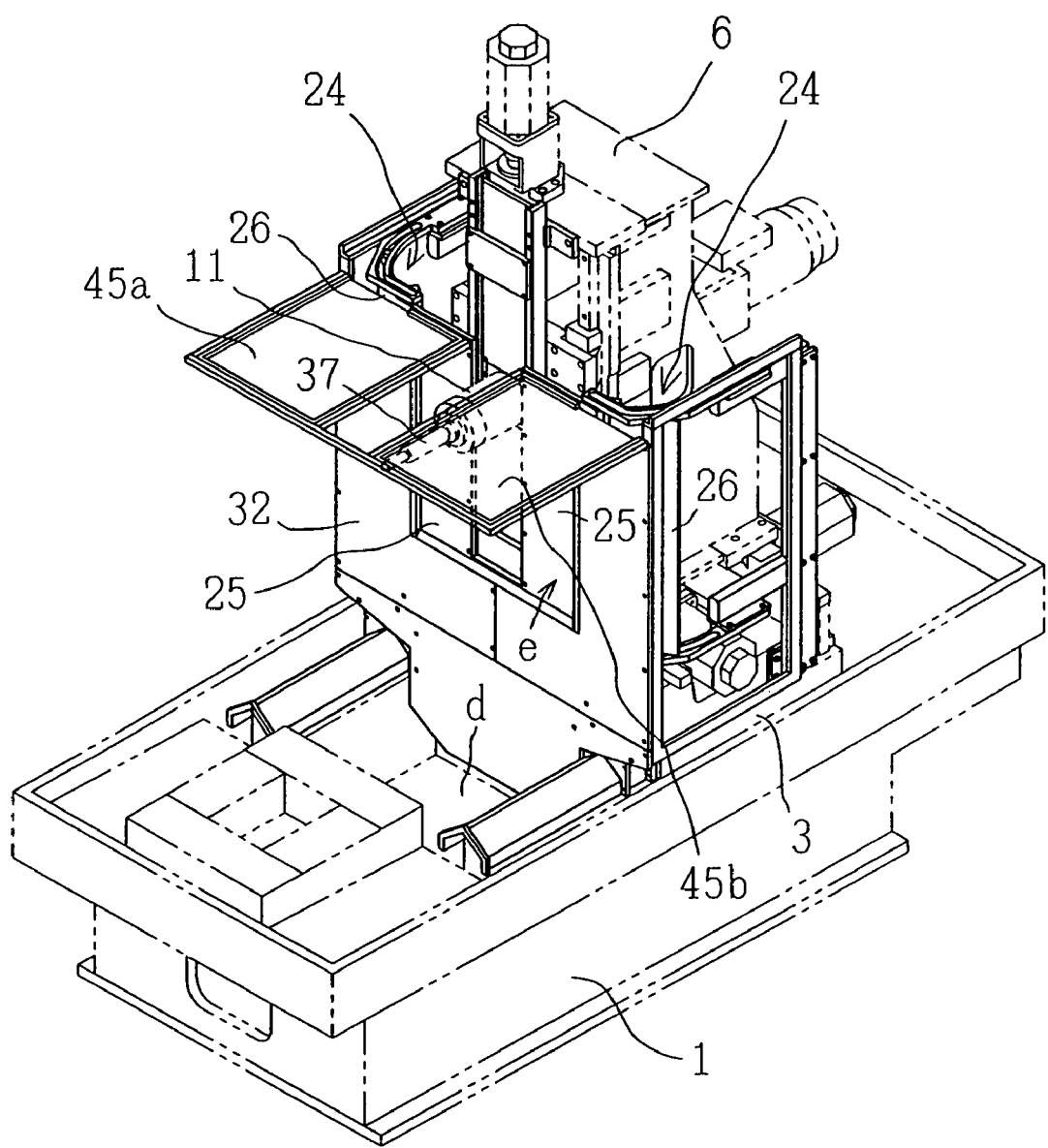
FIG. 3 is a perspective view showing a second cover plate and a fixed ceiling wall portion and the like of the machining center.

In FIG. 3, a second cover plate 32 shaped as a rectangle in plan view comprising a plurality of plane plates is fixed at the front side of the vertical extensible cover wall 15A and the right and left turnable cover devices 24, 24 integrally with the slide 3. The lateral width of the second cover plate 32 almost agrees with the whole width of the slide 3, and the upper edge thereof almost agrees with the highest position of the bearing cylinder 11. And besides, the lower portion thereof is extended downward from the slide 3 so that the lower edge thereof reaches the inside of a dropping hole "d" shaped as a rectangle in plan view formed to the bed 1. In addition, a through hole "e" shaped as a rectangle in front view is provided to allow the bearing cylinder 11 to move in the vertical direction and the lateral direction.

Figure 4:
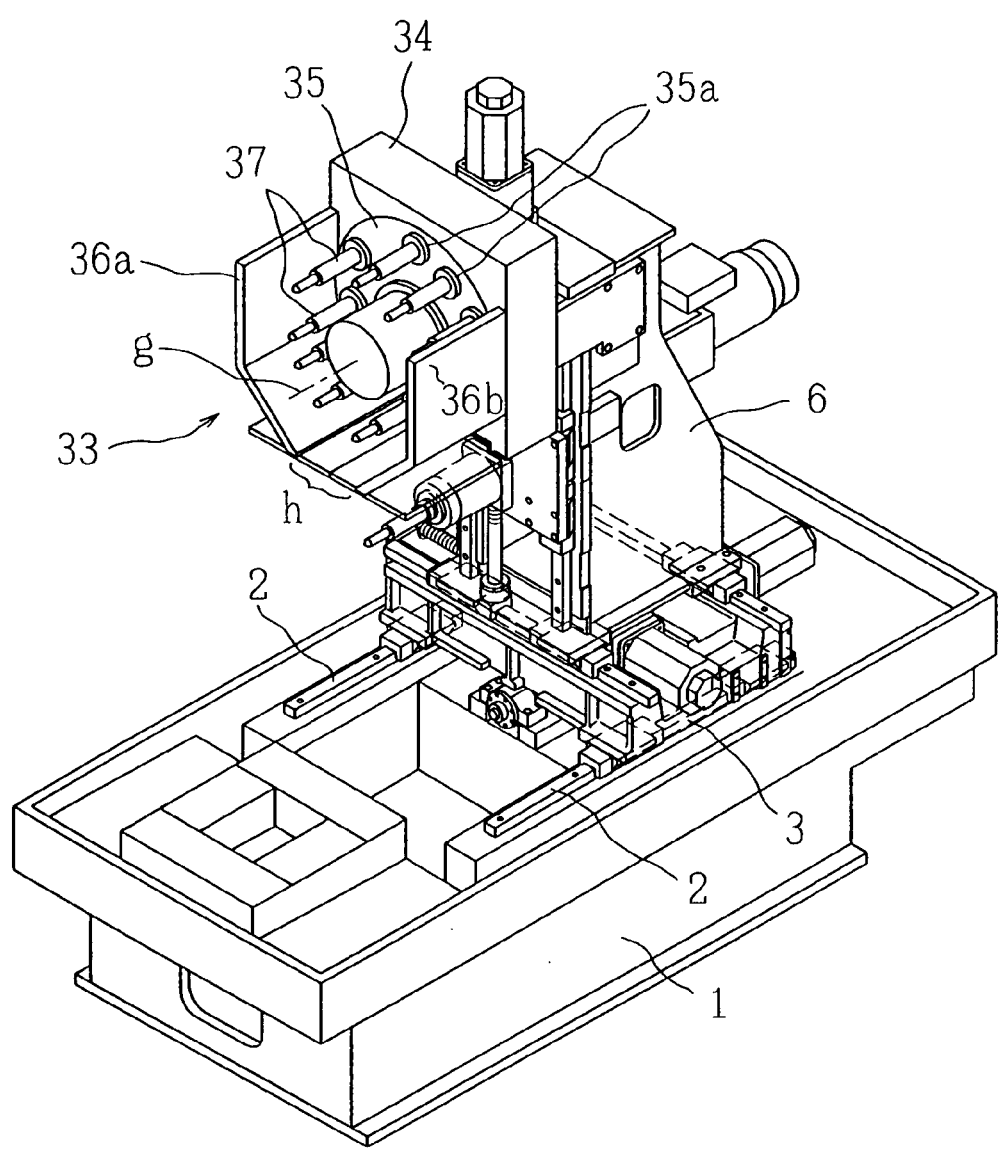
FIG. 4 is a perspective view showing the state where a casing or a door of the machining center is excepted.

In FIG. 4, a tool changer 33 is arranged at the upper front side of the column 6 to be fixed integrally with the column 6.

The detail structure of the tool changer 33 will be explained as follows. The tool changer 33 comprises a drive frame portion 34 fixed to the column 6 and a rotary type tool support rotating portion 35 supported by the frame portion 34 and rotated around a longitudinal axis "g". A pair of right and left side cover members 36a, 36b are fixed to the front face of the frame portion 34, and a space between the lower ends thereof forms a path "h" of the bearing cylinder 11.

In this case, the tool support rotating portion 35 forms many tool grip portions 35a on a circle centering the longitudinal axis "g" so that each of them grips a tool 37.

When exchanging the tool 37 installed on the spindle 10, first of all, the tool support-rotating portion 35 rotates around the longitudinal axis "g" so that an empty tool grip portion 35a is arranged at the lowest position, and the spindle 10 moves to a position corresponding to the empty tool grip portion 35a. Then, the tool support rotating portion 35, the tool grip portion 35a and the spindle 10 are connectedly operated, and the tool 37 installed on the spindle 10 is pulled out and gripped by the empty tool grip portion 35a. Then, the tool support-rotating portion 35 again rotates around the longitudinal axis "g" to move the tool grip portion 35a holding a next new tool 37 to the lowest position. And thereafter, the tool support rotating portion 35, the tool grip portion 35a and the spindle 10 are again connectedly operated, so that the tool 37 grasped by the tool grip portion 35a is installed on the spindle 10.

Figure 5:
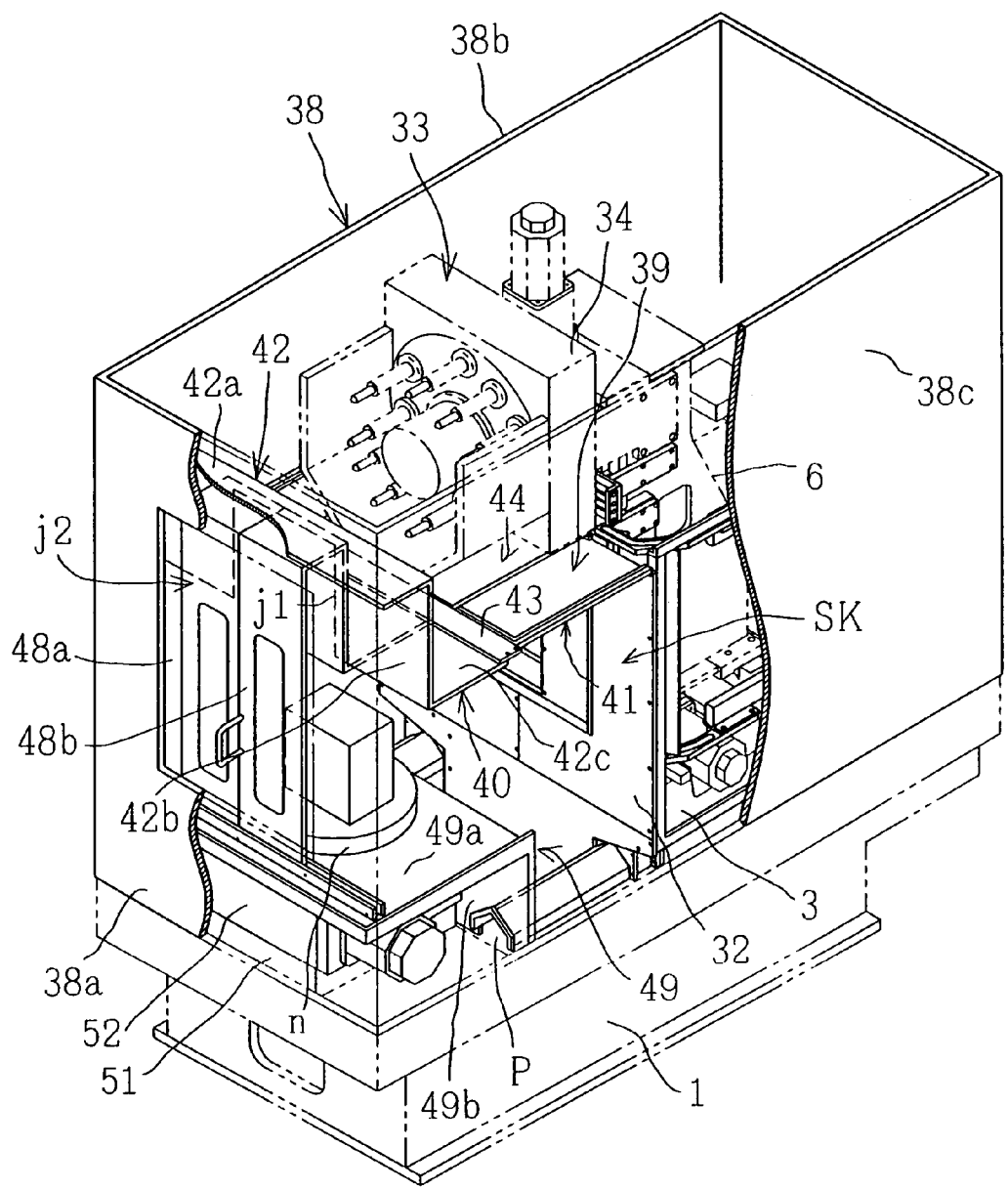
FIG. 5 is a perspective view of the machining center.

In FIG. 5, a shielded machining space SK is formed in front of the second cover plate 32, and the detail structure will be explained as follows.

A casing 38, which is a vertical square cylinder made of longitudinal and lateral peripheral walls, is fixed to the outer periphery of the top face of the bed 1. The lateral width of the casing 38 almost agrees with that of the slide 3, and the height thereof almost agrees with the upper portion of the frame 34. A ceiling wall portion 39 is formed at a specific high position of the inside of the casing 38, comprising a fixed ceiling wall portion 40 and a moving ceiling portion 41.

Figure 6:
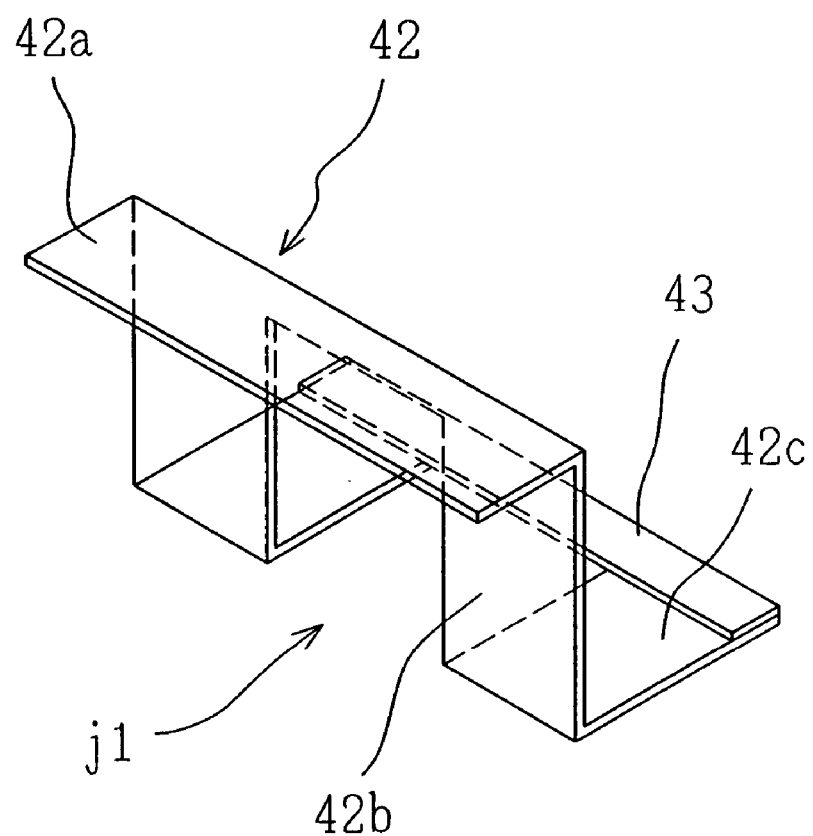
FIG. 6 is a perspective view of plate members of the fixed ceiling wall portion of the machining center.

In this case, the fixed ceiling wall portion 40 has a plate member 42 having almost the same width as the lateral width of the bed 1 fixed to the anterior upper portion of the casing 38. In addition, as shown in FIG. 6, the plate member 42 is formed of a high horizontal ceiling face portion 42a having a comparatively small longitudinal length, a standing ceiling face portion 42b having the length concerning to the height of a later vertical opening j2, and a low horizontal ceiling face portion 42c having a comparatively large longitudinal length in order from the anterior side. A lateral opening j1 is formed to the center of the lateral width from the standing ceiling face portion 42b to the low horizontal ceiling face portion 42c, and a lateral door guide member 43 is fixed to the rear end edge of the low horizontal ceiling face portion 42c.

Figure 7:
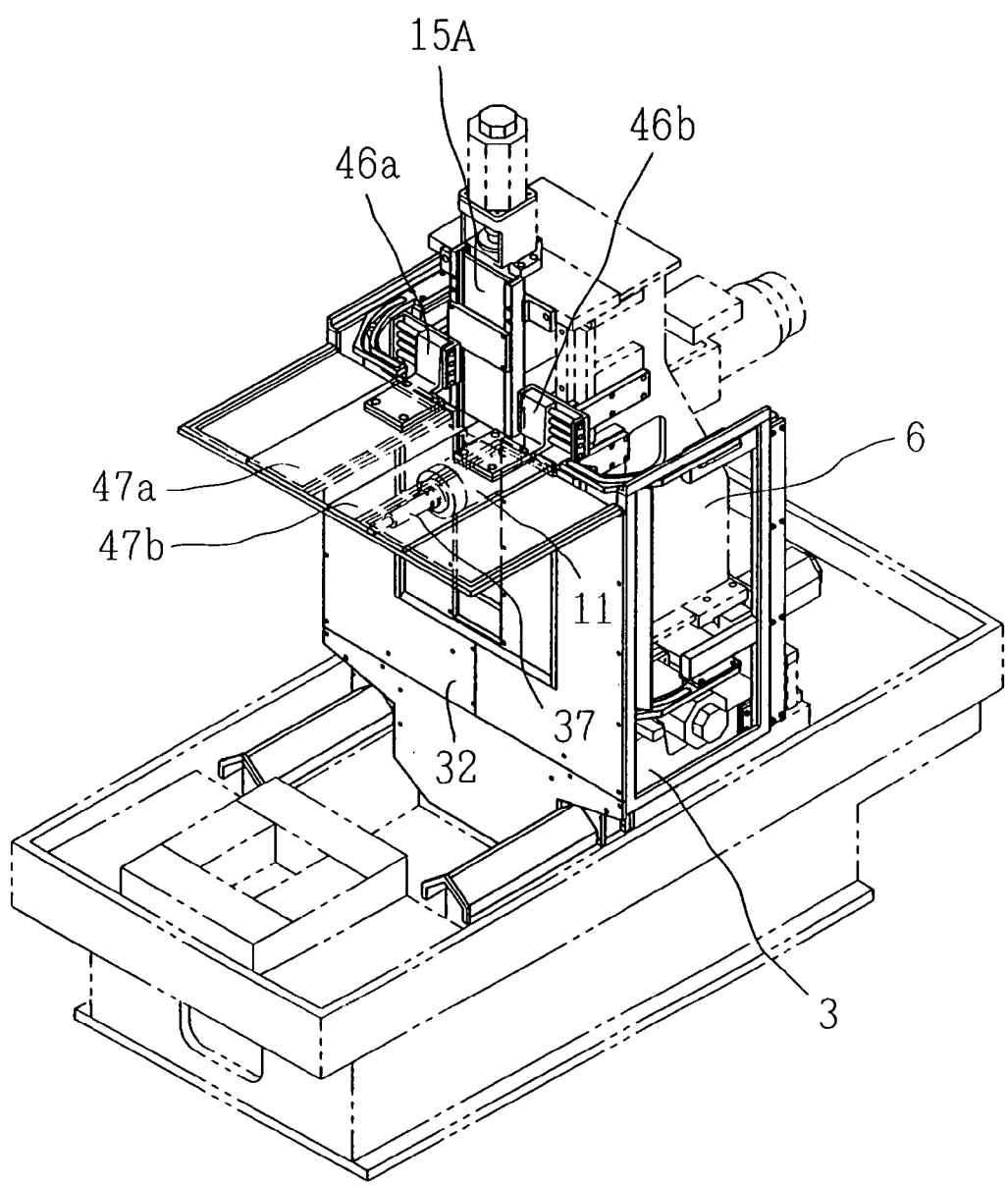
FIG. 7 is a perspective view showing the second cover plate and a moving ceiling wall portion and the like of the machining center.
Figure 8:
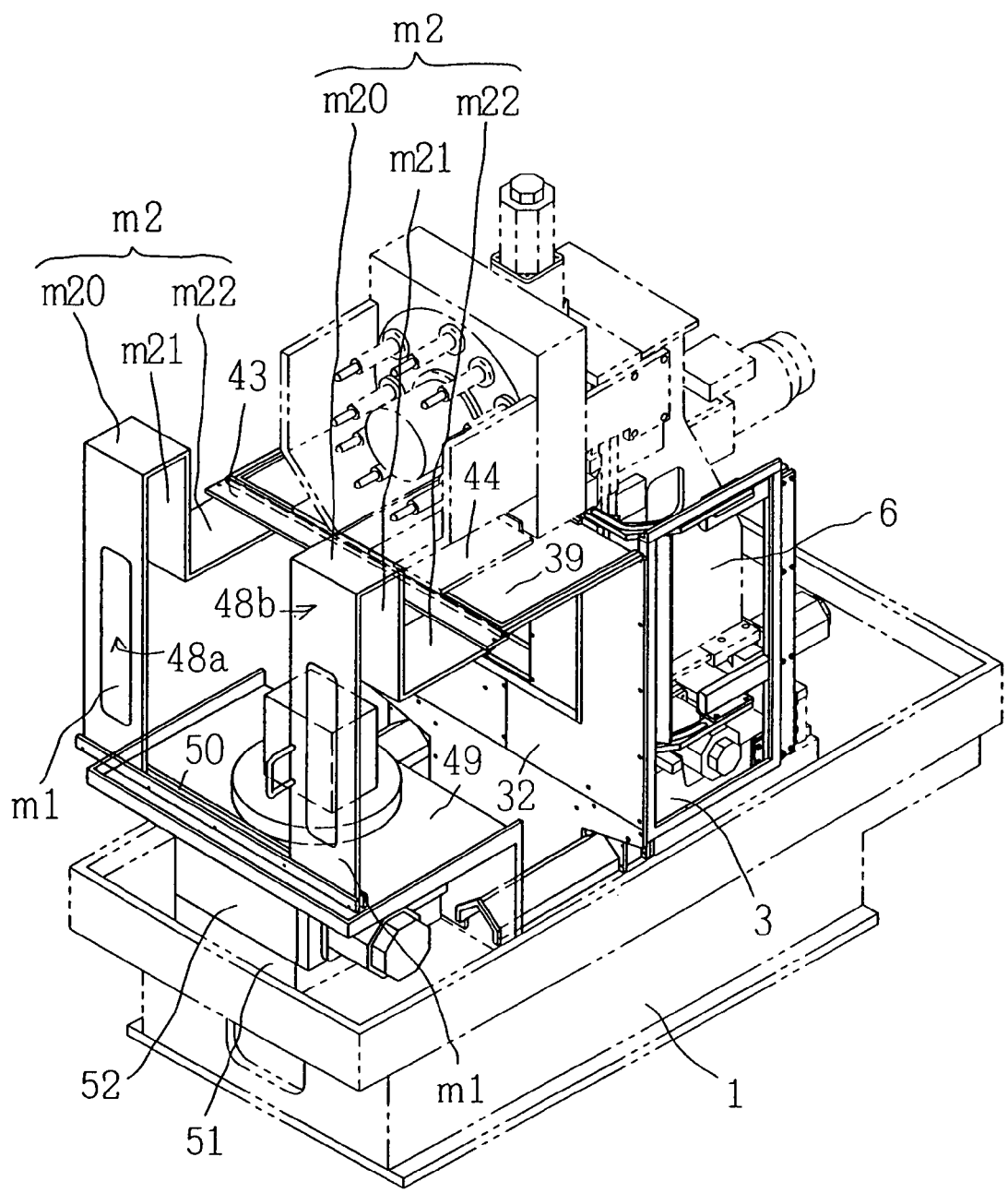
FIG. 8 is a perspective view of the state in which the casing of the machining center is removed.

The moving ceiling wall portion 41 is fixed at a lower position than the tool changer 33 integrally with the column 6, arranged at the upper portion of the fixed ceiling wall portion 40 superposably therewith, and provided with an opening 44 in connection with the tool changer 33. More concretely, as shown in FIG. 3, a pair of right and left rectangular ceiling plates 45a, 45b are horizontally protruded from the upper edge of the second cover plate 32 forward, and the outer edges thereof agree with the outer edge of the second cover plate 32. In addition, as shown in FIG. 7, a pair of right and left rectangular horizontal door plates 47a, 47b are arranged at an opening "k" formed between the ceiling plates 45a, 45b, installed closely and separably in the lateral direction through right and left driving portions 46a, 46b formed at the right and left sides of the front face of the column 6. The opening "k" is closed by the closing operation and opened by the separating operation.

In FIG. 5, a comparatively large vertical opening j2 shaped as a rectangle is formed to the front wall 38a of the casing 38 in connection with the lateral opening j1 (shown in FIG. 6) formed to the plate member 42. Here, the vertical opening j2 and the lateral opening j1 form a working opening. The working opening is closed and opened by a pair of right and left doors 48a, 48b. Each of the doors 48a, 48b comprises a standing door face portion m1 along the vertical opening j2 and a rear hanging door face portion m2 along the lateral opening j1. In addition, the lower end edge of the standing door face portion m1 is supported by a door guide member 50 supported by the front face wall 38a and a jig support table cover 49 displaceably in the lateral direction. The rear end edge of the rear hanging door face portion m2 is guided by the door guide member 43 displaceably in the lateral direction. In this case, the rear hanging door face portion m2 comprises the high horizontal door face portion m20, the standing door face portion m21, and the low horizontal door portion m22 along the shape of the plate member 42. The doors 48a, 48b are linked so that one side of door 48a is symmetrically displaced by laterally displacing the other side of door 48b.

Here, a space surrounded by the front face wall 38a of the casing 38, the doors 48a, 48b, the side face walls 38b, 38c and the ceiling wall portion 39 over the bed in front of the second cover plate 32 forms a shielded machining space SK.

As shown in FIG. 5, a jig support table 51 is provided to the anterior part of the shielded machining space SK, and the jig support table cover member 49 is fixedly provided in connection therewith. The jig support table cover member 49 comprises a horizontal face portion 49a for covering the upper face portion of the jig support table 51 and a standing face portion 49b for covering the rear face portion thereof. In addition, a jig 52 is fixed on the jig support table 51, and the jig 52, except a work mounting portion "n" is covered with the horizontal face portion 49a.

Figure 9:
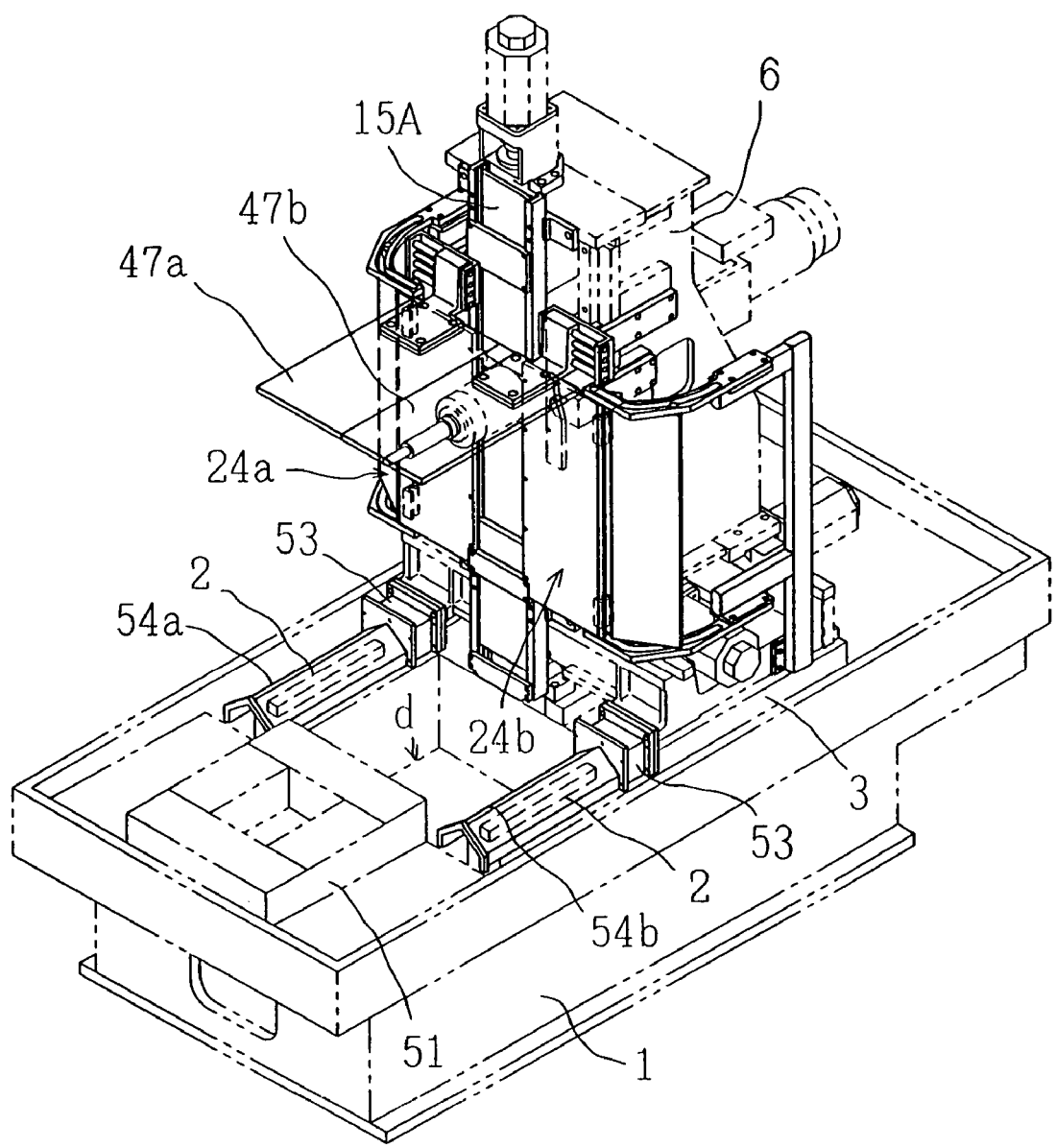
FIG. 9 is a perspective view showing the outside of rail cover members of the machining center.

At the right and left portions of the front face of the slide 3, as shown in FIG. 9, rail cover members 54a, 54b are fixed in a cantilever manner forward to cover the longitudinal guide rails 2, 2. Each of the rail cover members 54a, 54b comprises single rigid members having an angle section, and therein, extensible deformation by sliding of the members as in the past is not caused. In addition, as shown in FIG. 5, the length of each of the rail cover members 54a, 54b is so made that the front end thereof is inserted below the horizontal face portion 49a through a notch "p" formed in the standing face portion 49b in the state wherein the slide 3 is arranged at the rearmost position within the longitudinal moving range. In this case, a not-illustrated brushing means for scraping the cutting chips on the top faces of the rail cover members 54a, 54b is provided over the notch "p". A rubber plate, a soft resin plate or press hair is adopted as the brushing means.

Next, actions of the present invention will be explained.

When the spindle 10 moves in the vertical direction with the bearing cylinder 11, the upper cover plate 20a and the lower cover plates 21a, 21b of the vertical cover wall 15A are displaced in the vertical direction to allow the spindle 10 to move while keeping a shield face for cutting chips. In addition, when the column 6 moves in the lateral direction f2, the side cover plates 26 of right and left of the turnable cover devices 24, 24 operate so as to be turnable in the longitudinal direction from the first cover plates 25 to allow the column 6 to laterally move while keeping an intercept face for cutting chips at the right and left sides of the vertical cover wall 15A. Accordingly, even if the spindle 10 moves to an optional position within the fixed vertical and lateral moving range, the intercept faces for cutting chips due to the vertical cover wall 15A and the turnable cover devices 24, 24 are always formed to the rear of a through hole "e" of the second cover plate 32.

On the other hand, when the slide 3 moves in the longitudinal direction f1, the spindle 10 is moved in the longitudinal direction f1 integrally with the column 6 and the second cover plate 32. In this case, the rail cover members 54a, 54b are also longitudinally moved integrally with the column 6, and even if the column 6 is arranged at the optional position within the longitudinal moving range, they cover the longitudinal guide rails 2, 2.

When carrying the work "w" into the shielded machining space SK, other door 48b among the right and left doors 48a, 48b in FIG. 5 in close manner is displaced to the right side. Therefore, the doors 48a, 48b are separably displaced and opened. In this open condition, the top and the front of a work mounting portion "n" of the jig 52 are broadly exposed by opening the almost whole of the working openings j1, j2. The worker can carry the work "w" to the work mounting portion "n" without knocking his head against components of the machine tool. In addition, since the top of the work mounting portion "n" is opened, it is easy to use a crane and the like in carrying a heavy work "w".

After the work "w" is fixed to the work mounting portion "n", the doors 48a, 48b are closed by putting the door 48b back to its original position, and thereafter, the work "w" is machined by the tool 37 fixed to the spindle 10. While the work "w" is machined, the cutting chips are splashed and scattered in various directions by the tool 37 rotating with the spindle 10 inside the shielded machining space SK. However, the scattered cutting chips collide with the front face wall 38a and the side face walls 38b, 38c of the casing 38, the doors 48a, 48b, the ceiling wall portion 39, the second cover plate 32, the vertical cover wall 15A and the bendable cover devices 24, 24 and are thereby prevented from scattering rearward.

In this case, even if the spindle 10 is arranged at any position, the second cover plate 32, the vertical cover wall 15A, and the turnable cover devices 24, 24 can surely prevent the cutting chips from scattering for rearward from the front face of the column 6.

After the scattered cutting chips are guided to the jig support cover members 49, the rail cover members 54a, 54b and the top face of the bed 1, they are discharged below the bed 1 through the dropping hole "d". In this case, the jig support cover 49 prevents the cutting chips from creeping into the jig 52 except the work mounting portion "n" and around the jig support table 51. In addition, the rail cover members 54a, 54b surely prevent the cutting chips from accumulating on the longitudinal guide rails 2, 2 in spite of longitudinal movement of the column 6.

In the case of mist machining or coolant machining, although coolant is splashed just the same as the cutting chips, it is surely prevented from splashing out of the shielded machining space SK in accordance with the case of the cutting chips.

When exchanging the tool 37 installed on the spindle 10 through the tool exchange device 33, the spindle 10 is stopped rotating, and then, the door plates 47a, 47b are separated by the lateral driving devices 46a, 46b to open the opening 44. And thereafter, the spindle 10 ascends and moves to the position for exchanging the tool, and the tool 37 is exchanged and installed.

After this exchanging installation is finished, the spindle 10 descends for downward from the opening 44 to close the opening 44. According to this, the spindle 10 can get ready for machining through the new tool 37.

Each of the side cover plates 26 in the above-mentioned embodiment may be modified as follows. That is, it is anticipated that it comprises a few cover element plates, and besides, side edges of the cover element plates are continuously connected in bendable manner through hinge couplings and the like, and each of the cover element plates is guided by the guide means 27. To prevent each of the cover element plates from rattling, it is necessary that each of them be pressed onto a guiding face of the guide means 27 by energizing force such as springs.

The modification example around the door of the above-mentioned example will be explained with reference to FIG. 10 to FIG. 12.

Figure 10:
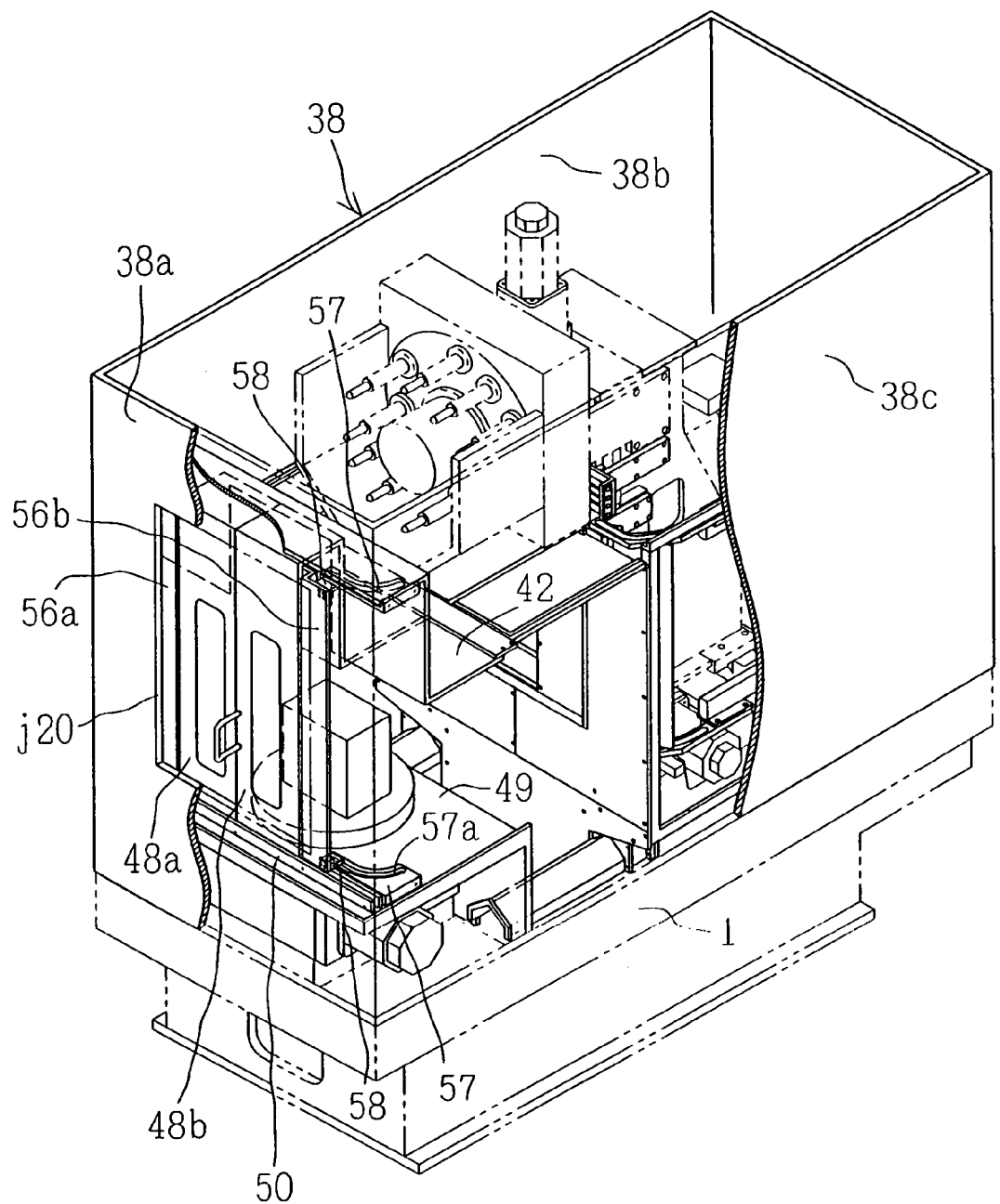
FIG. 10 is a perspective view of a modification of the machining center.
Figure 11:
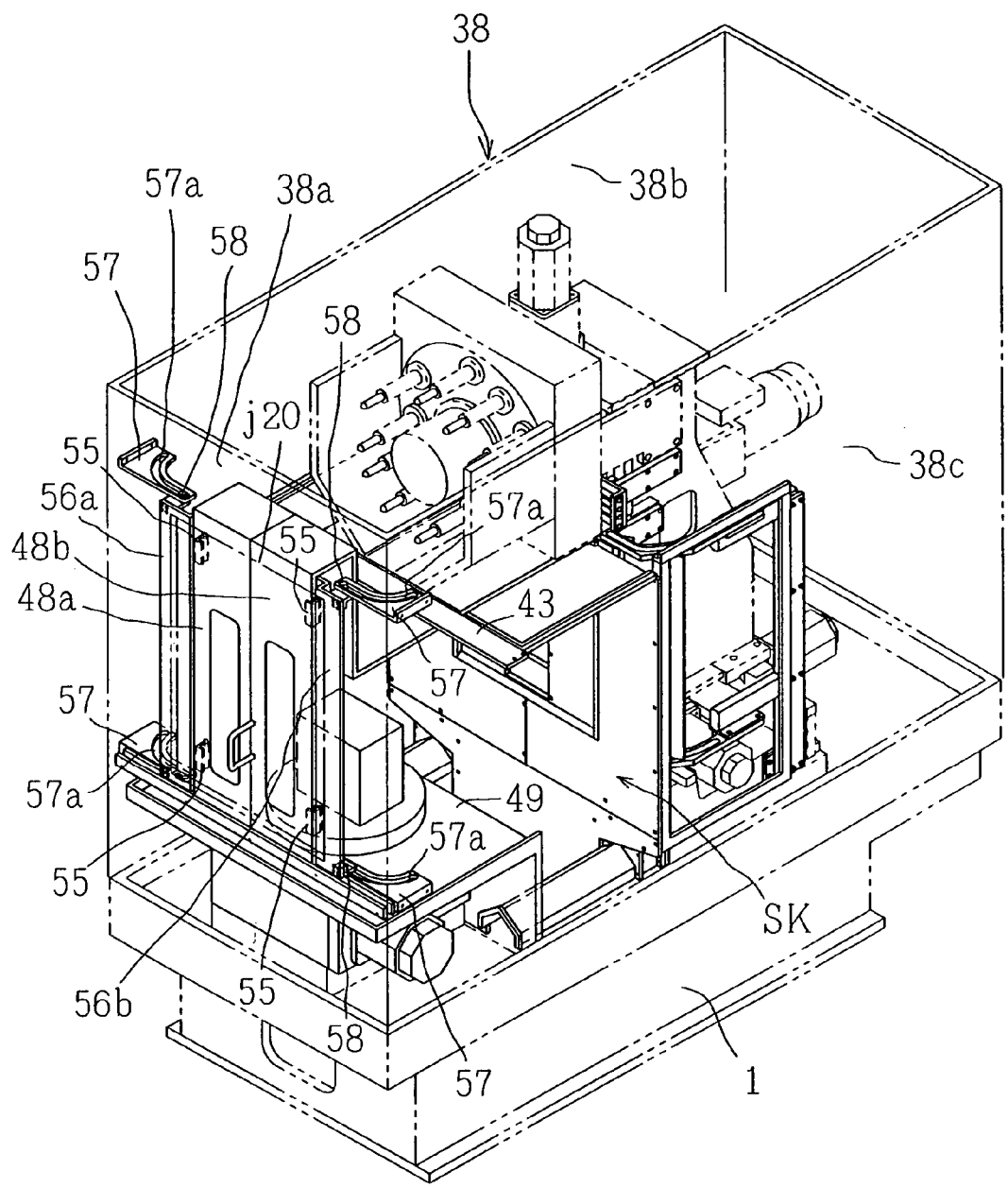
FIG. 11 is a perspective view for explaining the state in which the door is closed in the modification.
Figure 12:
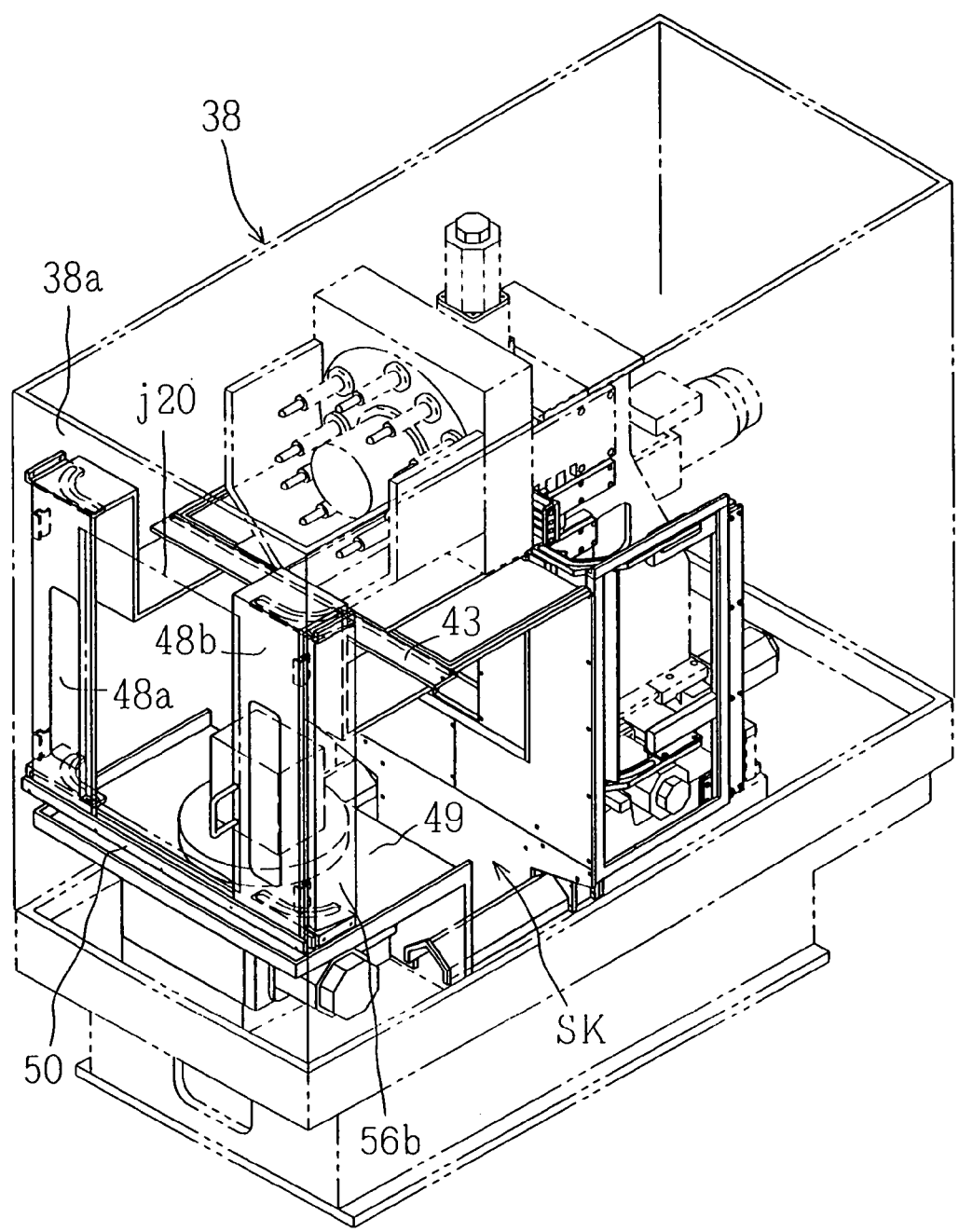
FIG. 12 is a perspective view for explaining the state in which the door is opened in the modification.
Figure 13:
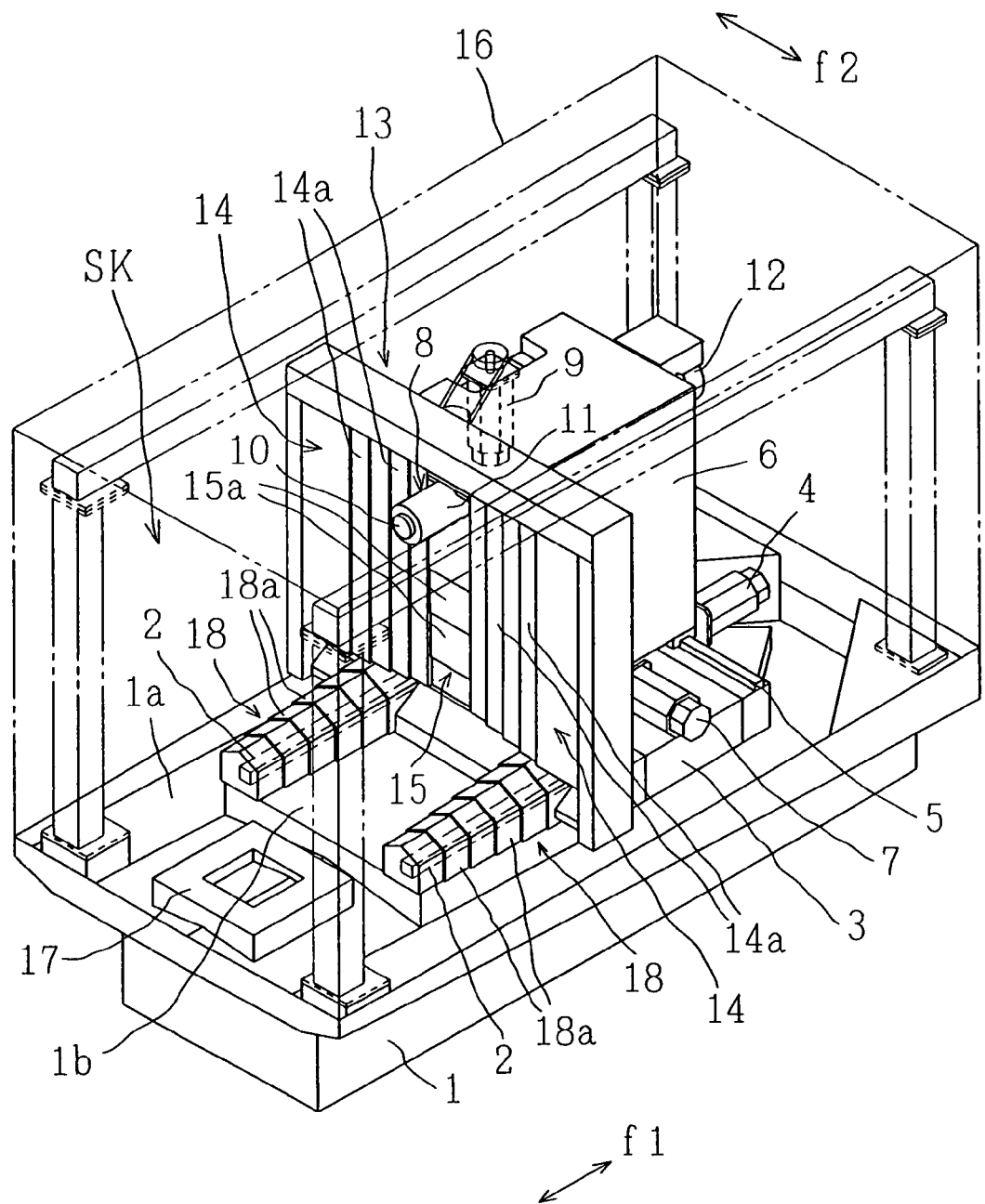
FIG. 13 is a perspective view of a conventional column moving type machining center.

In FIGS. 10 and 11, side door plates 56a, 56b are installed on the outside edge portions of the doors 48a, 48b through the hinge couplings 55 slidably in the longitudinal direction. A pair of upper and lower guide plates 56a, 56b are provided corresponding to the side door plates 56a, 56b, respectively. The guide plates 57, 57 are fixed to the front face wall 38a, the side face walls 38b, 38c of the casing 38, and rollers protrusively installed on the upper and lower edges of the side door plates 56a, 56b are inserted into circular guide routes 57a formed in the guide plates 57. Besides, a not-illustrated spring is hung between a portion around the center of curvature of a circular guide route 57a and a support shaft of a roller 58, and the side door plates 56a, 56b are pulled by the energizing force of the spring so as to rock rearward.

A vertical opening j20 formed in the front face wall 38a of the casing 38 is somewhat smaller than the size of the lateral width of the side door plates 56a, 56b added to the lateral width of the doors 48a, 48b, and besides, rather larger than the lateral width of the vertical opening j2.

Another conditions can be correspondingly applied to the above-mentioned example.

When the doors 48a, 48b and the side door-plates 56a, 56b are opened, from the state wherein they are closed as shown in FIG. 10, the door 48b is moved to the right outside. And therefore, the doors 48a, 48b are moved continuously with the side door-plates 56a, 56b so as to separate in the lateral direction. When the separating amount is over the fixed value, the side door-plates 56a, 56b are guided by the corresponding guide routes 57a to be rocked rearward. And lastly, the side door-plates 56a, 56b turn longitudinal as shown in FIG. 12 to completely open the doors 48a, 48b and the side door-plates 56a, 56b.

On the other hand, when the doors 48a, 48b and the side door-plates 56a, 56b are closed, a process is carried out in reverse order to the case of opening, and therefore, they are completely closed as shown in FIG. 11.

In the thus formed peripheral structure of the doors 48a, 48b, the vertical opening j20 forms a comparatively large lateral width without enlarging the lateral width of the front face wall 38a to open the shielded machining space SK broadly.

The invention claimed is:

1. A column moving type machine tool comprising:
 a pair of right and left longitudinal guide rails installed on a top face of a bed,
 a slide installed on the guide rails movably in a longitudinal direction,
 a column installed on the slide movably in a lateral direction, and
 a longitudinal spindle installed at a front face of the column (6) movably in a vertical direction,
 wherein first cover plates are fixed at right and left sides of a vertical moving route for the spindle at the front face of the column, side cover plates are installed continuously with outer end edges of the first cover plates so as to be turnable rearward by guide means provided between the side cover plates and the slide, a second cover plate is installed in front of the first cover plates and the side cover plates integrally with the slide so as to cover the full front side of the moving range, in a vertical direction and a lateral direction, of the column with the spindle, and a shielded machining space is formed in front of the second cover plate.

2. A column moving type machine tool as claimed in claim 1, wherein the second cover plate covers a front face of the slide, and a lower edge thereof is close to the top face of the bed.

3. A column moving type machine tool as claimed in claim 1, wherein a tool exchange device is installed on an upper portion of the column higher than a ceiling wall portion bounding the top of the shielded machining space, the ceiling wall portion comprises a fixed ceiling wall portion integrated with the bed and a moving ceiling wall portion fixed integrally with the column and arranged near the fixed ceiling wall portion superposably in the vertical direction, the moving ceiling wall portion is provided with an open and close opening at a position related to the tool exchange device, the fixed ceiling wall portion and the moving ceiling wall portion vary in superposed amount in connection with longitudinal movement of the column, and the opening is opened and closed when a tool installed on the spindle is exchanged.

4. A column moving type machine tool as claimed in claim 3, wherein an upper edge of a front face wall of a casing for the shielded machining space forms a work opening comprising a vertical opening higher than the moving ceiling wall portion and a lateral opening formed in an upper portion of a jig support table of the fixed ceiling wall portion in connection with the vertical opening, and doors comprising a standing door face portion for covering the vertical opening and a rearward protrusive door face portion for covering the lateral opening are installed in the work opening so as to open and close in the lateral direction.

5. A column moving type machine tool as claimed in claim 4, wherein the fixed ceiling wall portion is formed of plate members comprising, in order from an anterior side, a high horizontal ceiling face portion, a standing ceiling face portion and a low horizontal ceiling face portion wherein the lateral opening extends from the standing ceiling face portion to the low horizontal ceiling face portion, and wherein the rearward protrusive door face portion is formed so as to fit the lateral opening.

6. A column moving type machine tool as claimed in claim 1, wherein rail cover members for covering ranges in the guide rails are fixed integrally and protrusively forward on the front face of the slide so as not to be extensibly deformed.

7. A column moving type machine tool as claimed in claim 6, wherein a jig support table is installed in an anterior part of the shielded machining apace, wherein a jig support cover member comprising a horizontal face portion for covering a top face of the jig support table and a standing face portion covering the jig support table, wherein a lower edge of the standing face portion is close to the top face of the bed, wherein notches is provided in the standing face portion, and wherein anterior parts of the rail cover members extend movably through the jig support cover member in the longitudinal direction in the notches.

8. A column moving type machine tool as claimed in claim 7, wherein brush means for removing cutting chips from top faces of the rail cover members is positioned adjacent to upper portions of the notches.

* * * * *